(12) United States Patent
Okawara et al.

(10) Patent No.: US 12,293,590 B1
(45) Date of Patent: May 6, 2025

(54) CONSTRUCTION ZONE DETERMINING METHOD AND CONSTRUCTION ZONE DETERMINING DEVICE

(71) Applicant: Nissan Motor Co., Ltd., Yokohama (JP)

(72) Inventors: Masahiro Okawara, Kanagawa (JP); Yasuhisa Taira, Kanagawa (JP); Kazuyuki Uwabo, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 18/837,065

(22) PCT Filed: Feb. 14, 2022

(86) PCT No.: PCT/JP2022/005648
§ 371 (c)(1),
(2) Date: Aug. 8, 2024

(87) PCT Pub. No.: WO2023/152960
PCT Pub. Date: Aug. 17, 2023

(51) Int. Cl.
*G06T 7/246* (2017.01)
*B60W 60/00* (2020.01)
*G06V 20/58* (2022.01)

(52) U.S. Cl.
CPC .......... *G06V 20/58* (2022.01); *B60W 60/005* (2020.02)

(58) Field of Classification Search
CPC ........ G06N 3/045; G06N 3/08; G06N 3/0464; G06N 3/044; G06N 20/00; G06N 3/02; G06V 20/588; G06V 10/82; G06V 20/58; G06V 20/56; G06V 20/584; G06V 20/64; G06V 20/582; G06V 20/70; G06V 10/764; G06V 10/26; G06V 10/806; G06V 20/182; G06V 10/40; G06T 2207/10028; G06T 2207/30256; G06T 7/11; G06T 7/10; G06T 2207/10024; G06T 7/246;
(Continued)

(56) References Cited

U.S. PATENT DOCUMENTS 11,551,548 B1 * 1/2023 Nayak .............. G08G 1/096827
2014/0309833 A1 10/2014 Ferguson et al.
(Continued)

FOREIGN PATENT DOCUMENTS

CN 108974010 B * 5/2021 ............ B60W 50/00
JP 2016-520902 A 7/2016
(Continued)

*Primary Examiner* — Quan M Hua
(74) *Attorney, Agent, or Firm* — Young Basile Hanlon & MacFarlane, P.C.

(57) ABSTRACT

A processor determines whether a construction related item has been detected or not ahead of a subject vehicle based on vehicle surrounding information obtained by a sensor and determines that a point separated by a predetermined distance ahead of the subject vehicle from the construction related item is an end point of the road construction section when determining that the construction related item has been detected. The predetermined distance when the construction related item is detected and another vehicle is not detected around the detected construction related item is shorter than the predetermined distance when the construction related item is detected and the other vehicle is detected around the detected construction related item.

6 Claims, 3 Drawing Sheets

(58) Field of Classification Search
CPC ............. G06T 2207/20221; G06T 5/50; G06T 2207/20081; G06T 11/20; G06T 7/73; G06T 2207/20084; B60R 11/04
See application file for complete search history.

(56) References Cited

U.S. PATENT DOCUMENTS

| | | |
|---|---|---|
| 2015/0355640 A1 | 12/2015 | Ferguson et al. |
| 2017/0176996 A1 | 6/2017 | Ferguson et al. |
| 2017/0187963 A1* | 6/2017 | Lee .................... G01C 21/365 |
| 2019/0187723 A1 | 6/2019 | Tao et al. |
| 2019/0258261 A1 | 8/2019 | Ferguson et al. |
| 2019/0325736 A1* | 10/2019 | Zhang ................. G08G 1/0112 |
| 2020/0035102 A1 | 1/2020 | Satomura |
| 2020/0042802 A1 | 2/2020 | Nishimura et al. |
| 2022/0229439 A1 | 7/2022 | Ferguson et al. |

FOREIGN PATENT DOCUMENTS

| | | |
|---|---|---|
| JP | 2018-120409 A | 8/2018 |
| JP | 2019-145077 A | 8/2019 |
| JP | 2020-021398 A | 2/2020 |
| WO | 2018/061682 A1 | 4/2018 |

\* cited by examiner

CONSTRUCTION ZONE DETERMINING METHOD AND CONSTRUCTION ZONE DETERMINING DEVICE

TECHNICAL FIELD

The present invention relates to a construction section determination method and a construction section determination device.

BACKGROUND

There has been known a technique which generates an updated map based on real-time traffic information received from a plurality of autonomous driving vehicles by a remote server, and plans and controls the autonomous driving vehicle based on the real-time traffic information obtained from the updated map when the autonomous driving vehicle receives the updated map from the remote server (JP 2019-145077 A).

SUMMARY

The technique in JP 2019-145077 A is to, for example, when an end point of a road construction section is identified, detect the end point of the road construction section based on information obtained from the remote server, and the technique has a problem of not being able to identify the end point of the road construction section based on information detected by a sensor mounted on a subject vehicle.

A problem to be solved by the present invention is to provide a construction section determination method and a construction section determination device which enables identifying an end point of a road construction section based on information detected by a sensor mounted on a subject vehicle.

The present invention solves the above-described problem by determining whether a construction related item has been detected or not ahead of a subject vehicle based on vehicle surrounding information around the subject vehicle obtained by a sensor mounted on the subject vehicle and determining a point separated by a predetermined distance ahead of the subject vehicle from the construction related item as an end point of a road construction section when determining that the construction related item has been detected. The predetermined distance when the construction related item is detected and another vehicle is not detected around the detected construction related item is shorter than the predetermined distance when the construction related item is detected and the other vehicle is detected around the detected construction related item.

The present invention enables identifying an end point of a road construction section based on information detected by a sensor mounted on a subject vehicle.

DETAILED DESCRIPTION

Figure 1:
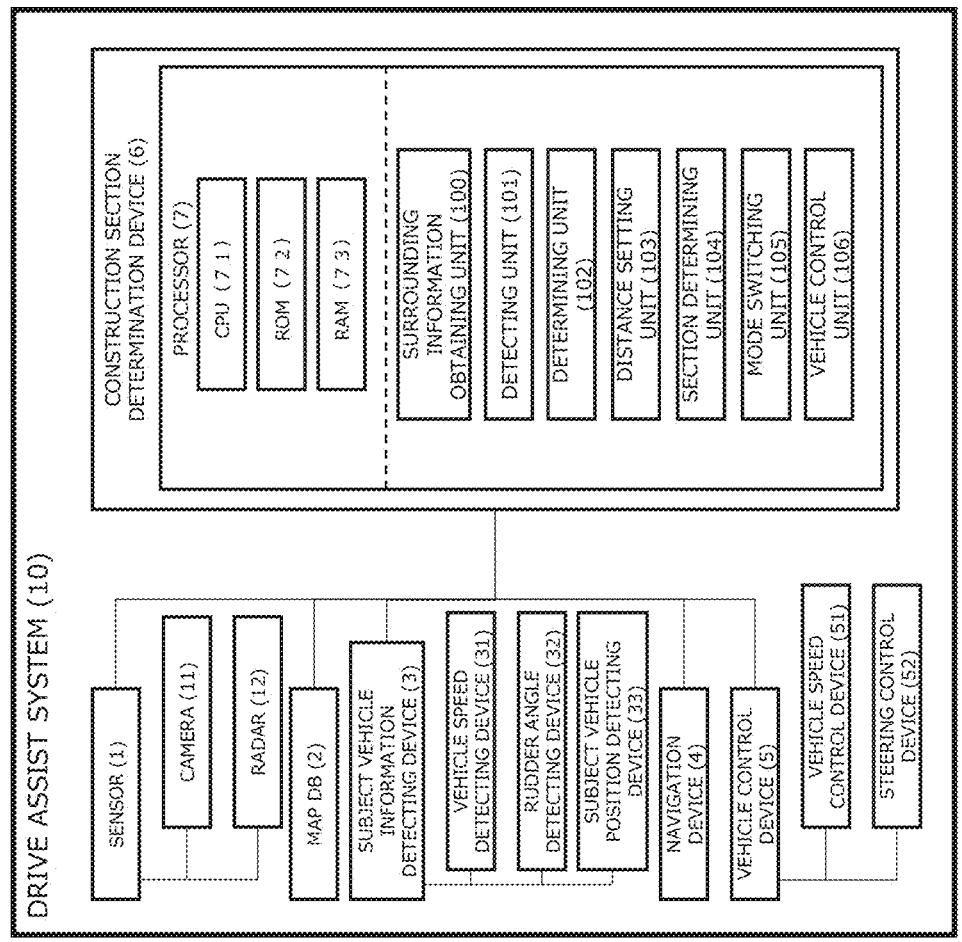
FIG. 1 is a drawing illustrating an exemplary configuration of a construction section determination device according to an embodiment.

One embodiment of a construction section determination device according to the present invention will be described based on the drawings. FIG. 1 is a block diagram illustrating a drive assist system 10 including the construction section determination device according to the present invention. As illustrated in FIG. 1, the drive assist system 10 includes a sensor 1, a map DB 2, a subject vehicle information detecting device 3, a navigation device 4, a vehicle control device 5, and a construction section determination device 6. The sensor 1 includes a camera 11 and a radar 12. The subject vehicle information detecting device 3 includes a vehicle speed detecting device 31, a rudder angle detecting device 32, and a subject vehicle position detecting device 33.

The vehicle control device 5 includes a vehicle speed control device 51 and a steering control device 52. The devices included in the drive assist system 10 are coupled via an in-vehicle LAN including a CAN, and are allowed to transmit or receive information to or from one another. In the embodiment, the drive assist system 10 assists a subject vehicle to drive in a road construction section determined by the construction section determination device 6.

Note that the following description is made on the premise that vehicles drive on the right side in a country with the law of right-hand traffic. In a country with the law of left-hand traffic, since vehicles drive on the left side, the following description is read by interchanging right and left.

The sensor 1 is a sensor for obtaining vehicle surrounding information around the subject vehicle including objects around the subject vehicle. The object is, for example, an automobile other than the subject vehicle (another vehicle), a motorcycle, a bicycle, a pedestrian, a traffic lane line on the road, a zebra zone as a buffer zone, a centerline, a road marking, a center divider, a guardrail, a curb, a sidewall on an expressway, a traffic sign, a traffic light, a crosswalk, a road construction site, an accident site, and a traffic restriction. The road construction site includes construction related items disposed for traffic regulation in the road construction section. The construction related item is, for example, a road cone and a barrel. The objects include an obstacle that possibly affects the driving of the subject vehicle. The sensor 1 obtains a position, a posture (a direction), and a speed of a moving body.

The sensor 1 detects the objects around the subject vehicle by, for example, the camera 11 and/or the radar 12. The construction section determination device 6 obtains a detection result of the sensor 1 as the vehicle surrounding information in a predetermined cycle. The camera 11 recognizes the objects around the subject vehicle by an image. A plurality of the cameras 11 may be disposed in one vehicle. For example, the camera 11 includes a front camera, a side camera, and a back camera. The radar 12 is a device for performing an operation of a relative distance and a relative velocity between the vehicle and the object, and is, for example, a laser radar and the like. A plurality of the radars 12 may be disposed in one vehicle. In the embodiment, the camera 11 obtains a captured image in which an image ahead of the subject vehicle is captured in a predetermined cycle, and detects the objects around the subject vehicle by the captured image.

The map DB 2 is a database including information used for generation of a drive route and/or cruise control, and includes road information of each map coordinate, boundary information of traffic lanes, road attribute information, inbound and outbound information of traffic lanes, traffic lane identification information, connecting lane information, facility information, and their attribute information. The road information includes information of road widths, curvature radii, road shoulder constructions, the road traffic act (the speed limit, whether a traffic lane change is allowed or not), road merging points, diverging points, positions where the number of traffic lanes increases and decreases, and the like.

The map DB 2 includes information of traffic lane boundaries indicating boundaries between the traffic lane on which the subject vehicle travels and the others. The traffic lane boundaries exist on both right and left with respect to a traveling direction of the subject vehicle. The traffic lane boundaries include, for example, road markings and road constructions. The road markings are, for example, traffic lane lines and a centerline. The road constructions are, for example, a center divider, guardrails, curbs, tunnels, or sidewalls of an expressway. Note that there are preliminarily set virtual driving boundaries as the traffic lane boundaries at points where the traffic lane boundaries are not identifiable (for example, in an intersection) in the map DB.

The subject vehicle information detecting device 3 is a device that detects information relating to a state of the subject vehicle. The state of the subject vehicle includes a driving speed, an acceleration rate, a steering angle, a position, a posture, and the like of the subject vehicle. The vehicle speed detecting device 31 detects the driving speed and the acceleration rate. The rudder angle detecting device 32 detects the steering angle. The current position is calculated based on information obtained from the subject vehicle position detecting device 33. The subject vehicle position detecting device 33 is, for example, a positioning system including a GPS unit and the like. The posture is detected using an inertial measurement unit. The subject vehicle information detecting device 3 may obtain the driving speed and the steering angle of the subject vehicle from the vehicle control device 5. The construction section determination device 6 obtains detection results of these devices via the in-vehicle LAN as necessary.

The navigation device 4 is a device that calculates a drive route to a destination set by a driver from the current position of the subject vehicle detected by the subject vehicle position detecting device 33 of the subject vehicle information detecting device 3 with reference to the map DB 2. The calculated drive route is output to the construction section determination device 6. The drive route is in a linear shape in which the road, the direction (inbound/outbound), and the traffic lane on which the subject vehicle travels are identified. The drive route includes information of a driving lane.

The vehicle control device 5 is an on-board computer, such as an electronic control unit (ECU), and electronically controls on-board equipment controlling the driving of the vehicle. The vehicle control device 5 includes the vehicle speed control device 51 that controls the driving speed of the subject vehicle and the steering control device 52 that controls the steering operation of the subject vehicle.

The vehicle speed control device 51 controls an electric motor as a driving source and/or a driving device, such as an internal combustion engine and an automatic transmission. The vehicle speed control device 51 autonomously controls the driving speed of the vehicle based on a control signal input from the construction section determination device 6. The steering control device 52 controls a steering device. The steering control device 52 controls the operation of the steering device such that the subject vehicle travels while maintaining a predetermined lateral position (a position in a right-left direction of the vehicle) with respect to the drive route using at least one of the detection result of the sensor 1, the map DB 2, and the subject vehicle information obtained by the subject vehicle information detecting device 3 based on the control signal input from the construction section determination device 6.

The construction section determination device 6 is a device that determines a road construction section in which the construction related item is disposed while the subject vehicle is traveling by controlling the devices included in the drive assist system 10 to cause them to collaborate. The construction section determination device 6 sets the road construction section when the construction related item is detected ahead of the subject vehicle. In the embodiment, the road construction section is a section in which the driving of the subject vehicle is controlled in a hands-on state where the driver is requested to hold a steering wheel. A normal section as a section other than the road construction section is a section in which the driving of the subject vehicle is controlled in a hands-off state where the driver takes his/her hands off the steering wheel.

The construction section determination device 6 achieves the determination of the construction section by a processor 7. The processor 7 is a computer including a ROM 72 in which programs are stored, a CPU 71 as an operation circuit for functioning as the construction section determination device 6 by executing the programs stored in the ROM 72, and a RAM 73 that functions as an accessible storage device. The processor 7 according to the embodiment executes each function by collaboration of software for achieving the above-described functions and the above-described hardware.

The processor 7 includes a surrounding information obtaining unit 100, a detecting unit 101, a determining unit 102, a distance setting unit 103, a section determining unit 104, a mode switching unit 105, and a vehicle control unit 106 as function blocks. Note that while the functions of the processor 7 are divided into seven blocks to describe the functions of the respective function blocks in the embodiment, the functions of the processor 7 do not necessarily have to be divided into seven blocks as long as the configuration allows achieving the respective functions.

The surrounding information obtaining unit 100 obtains the vehicle surrounding information around the subject vehicle from the sensor 1. The vehicle surrounding information is, for example, a vehicle surrounding image around the subject vehicle captured by the camera 11 and includes information of a detection result of the objects around the subject vehicle. For example, the surrounding information obtaining unit 100 obtains the vehicle surrounding information in a constant cycle while the subject vehicle is traveling.

The detecting unit 101 detects the construction related item and another vehicle positioned ahead of the subject vehicle based on the vehicle surrounding information. For example, the detecting unit 101 identifies a driving road ahead of the subject vehicle, and detects the construction related item and the other vehicle positioned on the driving road. The driving road ahead of the subject vehicle includes a subject vehicle traffic lane in which the subject vehicle is traveling and traffic lanes around the subject vehicle traffic lane. The detecting unit 101 may detect the construction related item positioned around the driving road ahead of the subject vehicle.

The detecting unit 101 detects the other vehicle positioned around the detected construction related item based on the vehicle surrounding information. For example, the detecting unit 101 detects the other vehicle in a detection range in which the camera 11 is allowed to detect the construction related item.

The determining unit 102 determines whether the construction related item has been detected or not ahead of the subject vehicle based on the vehicle surrounding information. In the embodiment, the determining unit 102 determines whether the construction related item has been detected or not ahead of the subject vehicle based on the vehicle surrounding information in a constant cycle while the subject vehicle is traveling.

The determining unit 102 determines a type of the detected construction related item. The type of the construction related item is, for example, any one of a road cone and a barrel.

The determining unit 102 determines whether the construction related item has been additionally detected or not in a predetermined section from a time point when it is determined that the construction related item has been detected. For example, the predetermined section is a distance obtained by adding 450 m to the distance from the current position of the subject vehicle to the position of the detected construction related item. The determining unit 102 determines whether the construction related item has been additionally detected or not based on the vehicle surrounding information obtained by the surrounding information obtaining unit 100 in the constant cycle in a period from the time point when it is determined that the construction related item has been detected until the subject vehicle passes the predetermined section. In the embodiment, when it is determined that the construction related item has not been additionally detected in the predetermined section from the time point when it is determined that the construction related item has been detected, the construction related item detected immediately before is the last detected construction related item.

The determining unit 102 determines whether the other vehicle has been detected or not around the construction related item based on the vehicle surrounding information when it is determined that the construction related item has been detected ahead of the subject vehicle. The determining unit 102 may determine whether the other vehicle has been detected or not in a direction in which the construction related item is positioned with respect to the subject vehicle. For example, the determining unit 102 determines whether the other vehicle has been detected or not in the left direction, the right direction, or the front direction with respect to the subject vehicle when the construction related item is positioned in the left direction, the right direction, or the front direction with respect to the subject vehicle, respectively.

The determining unit 102, for example, determines that the construction related item or the other vehicle is positioned in the left direction when the construction related item or the other vehicle is positioned at the left side with respect to the left traffic lane line of the subject vehicle traffic lane. The determining unit 102, for example, determines that the construction related item or the other vehicle is positioned in the right direction when the construction related item or the other vehicle is positioned at the right side with respect to the right traffic lane line of the subject vehicle traffic lane. The determining unit 102 determines that the construction related item or the other vehicle is positioned in the front direction when the construction related item or the other vehicle is positioned ahead of the subject vehicle on the subject vehicle traffic lane.

The determining unit 102 is not limited to determining whether the other vehicle has been detected or not when the construction related item has been detected, and the determining unit 102 may determine whether the other vehicle has been detected or not in a certain section after the construction related item has been detected. For example, the determining unit 102 may determine whether the other vehicle has been detected or not in the detection range of the camera 11 until the subject vehicle passes the detected construction related item after the construction related item has been detected.

The determining unit 102 determines whether an end sign indicating that the road construction section is finished has been detected or not ahead of the subject vehicle based on the vehicle surrounding information. The end sign is, for example, a sign describing that the road construction section is finished.

The distance setting unit 103 sets a predetermined distance indicating the distance from the construction related item to an end point of the road construction section. For example, the distance setting unit 103 sets the predetermined distance to a first distance. The first distance is, for example, 450 m. The predetermined distance when the construction related item is detected and the other vehicle is not detected around the detected construction related item is shorter than the predetermined distance when the construction related item is detected and the other vehicle is detected around the detected construction related item. That is, when the determining unit 102 determines that the construction related item has been detected and the other vehicle has not been detected around the detected construction related item, the distance setting unit 103 sets the predetermined distance shorter than the predetermined distance when the determining unit 102 determines that the construction related item has been detected and the other vehicle has been detected around the detected construction related item. For example, the distance setting unit 103 sets the predetermined distance to the first distance when it is determined that the construction related item has been detected and the other vehicle has been detected around the detected construction related item. The distance setting unit 103 sets the predetermined distance to a second distance shorter than the first distance when it is determined that the construction related item has been detected and the other vehicle has not been detected around the detected construction related item. The second distance is, for example, 300 m.

The distance setting unit 103 may further set the predetermined distance corresponding to the type of the detected construction related item when it is determined that the other vehicle has not been detected. For example, when all the detected construction related items are road cones, the predetermined distance is shorter than the predetermined distance when all the detected construction related items are barrels. That is, when all the detected construction related items are road cones, the distance setting unit 103 sets the predetermined distance shorter than the predetermined distance when all the detected construction related items are barrels. The distance setting unit 103 sets the predetermined distance to the second distance when all the detected construction related items are barrels. Meanwhile, the distance setting unit 103 sets the predetermined distance to a third distance shorter than the second distance when all the detected construction related items are road cones. The third distance is, for example, 150 m. Generally, in a large-scale road construction site, barrels are disposed, and road cones are disposed in a small-scale road construction site. Therefore, when all the detected construction related items are barrels, the predetermined distance is set such that the road construction section is long.

The section determining unit 104 determines the road construction section. The road construction section is a section along the traveling direction of the subject vehicle, and is a section between the start point and the end point. The section determining unit 104 determines the start point and the end point of the road construction section based on the position of the detected construction related item and the set predetermined distance.

First, the section determining unit 104 determines the road construction section based on the position of the first detected construction related item and the predetermined distance when the construction related item is detected first. For example, the section determining unit 104 determines that the position of the first detected construction related item is the start point of the road construction section, and determines that the point separated by the first distance ahead of the subject vehicle from the position of the first detected construction related item is the end point of the road construction section.

The section determining unit 104 updates the end point of the road construction section when the construction related item is additionally detected in the road construction section after the road construction section has been determined. For example, after the distance setting unit 103 has executed the setting of the predetermined distance based on the existence of the other vehicle, the section determining unit 104 determines that the point separated by the set predetermined distance ahead of the subject vehicle from the position of the additionally detected construction related item is the end point of the road construction section. That is, the section determining unit 104 updates the end point of the road construction section to the point separated by the predetermined distance from the position of the detected construction related item every time the construction related item is detected while the subject vehicle is traveling.

For example, the section determining unit 104 updates the end point of the road construction section to the point separated by the second distance ahead of the subject vehicle from the position of the detected construction related item when the other vehicle is not detected around the detected construction related item in a case where the construction related item is additionally detected in the road construction section.

The section determining unit 104 updates the end point of the road construction section to the point where the end sign is disposed when the determining unit 102 determines that the end sign has been detected in the road construction section.

Figure 2:
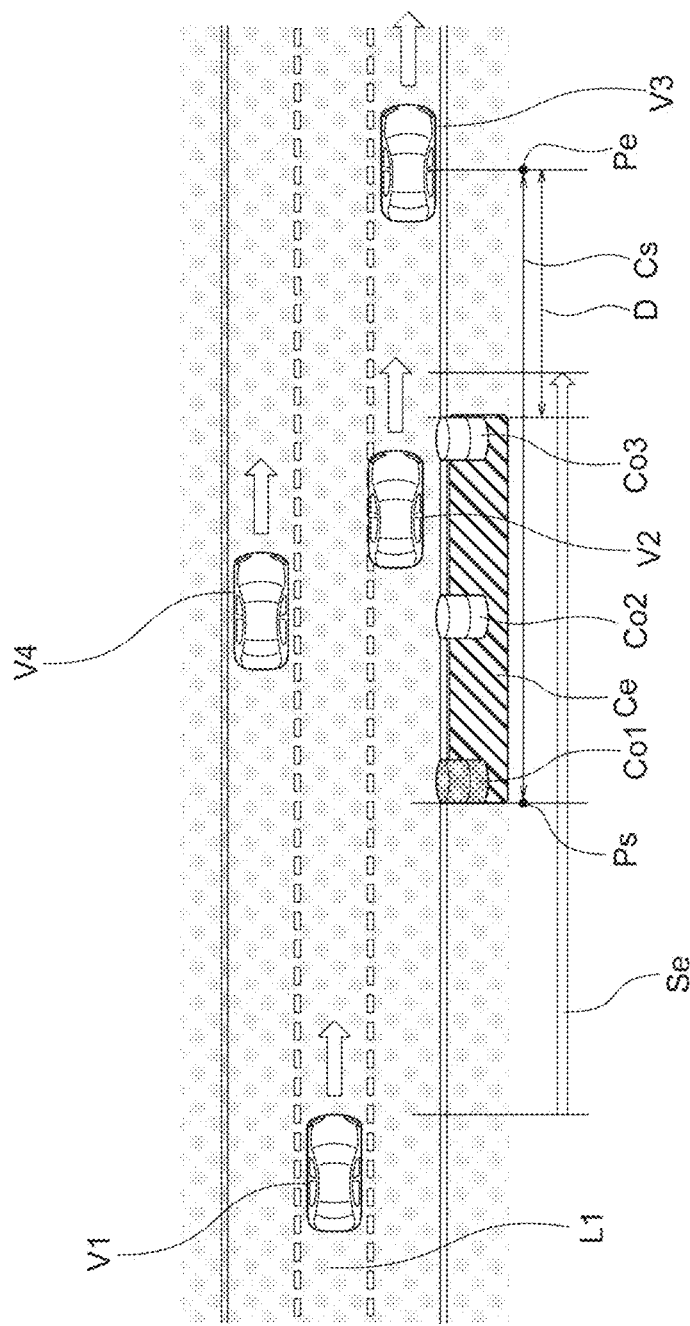
FIG. 2 is a drawing illustrating an exemplary situation where a construction section determination method according to the embodiment is executed.

Next, a determination method of the road construction section will be described using FIG. 2. FIG. 2 is a drawing illustrating a situation where a section determination method according to the embodiment is executed. FIG. 2 illustrates a situation where a road construction area Ce exists ahead of a subject vehicle V1 when the subject vehicle V1 is traveling on a driving road. In the road construction area Ce, construction related items Co1, Co2, and Co3 are disposed. There are other vehicles V2, V3, and V4 driving ahead of the subject vehicle V1.

In FIG. 2, the subject vehicle V1 detects the construction related items Co1, Co2, and Co3 in a detection range Se of a camera. The construction related item Co3 is the last detected construction related item. The processor 7 determines that a position of the construction related item Co1 as the first detected construction related item is a start point Ps of a road construction section Cs, and determines that a point separated by a predetermined distance D from a position of the construction related item Co3 as the last detected construction related item is an end point Pe of the road construction section Cs. At this time, the processor 7 determines whether the other vehicle exists or not in the right direction with respect to the subject vehicle V1 as a direction in which the construction related item Co3 is positioned. In the example of FIG. 2, the processor 7 determines that the other vehicle V2 has been detected in the right direction with respect to the subject vehicle V1, and sets the predetermined distance D to the first distance.

As in FIG. 2, when the other vehicle V2 is positioned around the construction related item, the other vehicle V2 generates a blind spot, and therefore, it is not confirmed whether there is an additional construction related item or not at a far side in the traveling direction with respect to the construction related item Co3. In the embodiment, the construction related item Co3 is the last detected construction related item when it is not determined that the construction related item has been additionally detected while the subject vehicle V1 is traveling to the end point Pe determined at the point separated by the predetermined distance D from the construction related item Co3.

For example, when the construction related item is additionally detected before the subject vehicle V1 reaches the end point Pe of the road construction section Cs after the construction related item Co3 has been detected, the end point Pe is updated to the point separated by the predetermined distance D from the additionally detected construction related item. Note that, in the example of FIG. 2, the other vehicle V3 is positioned outside the detection range Se of the camera, and therefore is not subjected to detection. While the other vehicle V4 is positioned in the detection range Se of the camera, it is positioned in a different direction (the left direction) from the direction in which the construction related item Co3 is positioned, and therefore, it is not subjected to determination.

For example, according to the law of the United States of America, when a sign indicating that a road construction section is finished is disposed, the sign is disposed at a point separated by approximately 300 m to 450 m from the last construction related item. That is, there exists a section with no construction related item from the last construction related item to the sign. It is inconvenient for a driver to drive in the hands-on state in the section with no construction related item after the subject vehicle passes the last construction related item. From the driver's point of view, it is preferred that the driving of the subject vehicle switches to the driving in the hands-off state promptly after the subject vehicle passes the road construction site. Therefore, when a sign is discovered at a near side with respect to a point where a sign is generally set, setting the end point of the road construction section at the near side enables resuming the driving of the subject vehicle in the hands-off state at an early timing.

However, for example, when the other vehicle exists around the construction related item and a blind spot is generated by the other vehicle, it fails to be determined whether the detected construction related item is the last construction related item or not. Meanwhile, when no other vehicle exists around the construction related item and no blind spot is generated by the other vehicle, it is allowed to be determined that no additionally detected construction related item exists when no construction related item is detected. Therefore, in the embodiment, when no other vehicle exists around the construction related item, the end point of the road construction section is set at the near side. This allows determining that the subject vehicle has passed the road construction section at an early timing, and therefore, the driving of the subject vehicle in the road construction section switches from the driving in the hands-on state to the driving in the hands-off state at an earlier timing, thereby enabling providing effective driving assistance for a driver.

The mode switching unit 105 switches driving modes for the driver. The driving modes include a hands-on mode and a hands-off mode. The hands-on mode is a mode in which the driving of the subject vehicle is controlled in the hands-on state where the driver is requested to hold the steering wheel. The hands-off mode is a mode in which the driving of the subject vehicle is controlled in the hands-off state where the driver is allowed to take his/her hands off the steering wheel. The mode switching unit 105 sets the driving mode to the hands-on mode while the subject vehicle is traveling in the road construction section. The mode switching unit 105 sets the driving mode to the hands-off mode while the subject vehicle is traveling in the normal section other than the road construction section. For example, the mode switching unit 105 sets the driving mode to the hands-off mode when the subject vehicle starts to drive.

The mode switching unit 105 determines whether the subject vehicle has reached the start point of the road construction section or not. When it is determined that the subject vehicle has reached the start point of the road construction section, the mode switching unit 105 switches the driving mode from the hands-off mode to the hands-on mode. That is, the start point of the road construction section is a point where the normal section where the driving mode is set to the hands-off mode is switched to the road construction section where the driving mode is set to the hands-on mode. The mode switching unit 105 may determine whether the subject vehicle has reached a position at the near side with respect to the start point of the road construction section or not. The mode switching unit 105 determines whether the subject vehicle has reached the end point of the road construction section or not. When it is determined that the subject vehicle has reached the end point of the road construction section, the mode switching unit 105 switches the driving mode from the hands-on mode to the hands-off mode. That is, the end point of the road construction section is a point where the road construction section where the driving mode is set to the hands-on mode is switched to the normal section where the driving mode is set to the hands-off mode.

The mode switching unit 105 may calculate a target distance from the current position of the subject vehicle at a time point when the end sign is detected to the point where the end sign is disposed, and may determine whether the subject vehicle has reached the end point of the road construction section or not depending on whether the subject vehicle has traveled the target distance or not. For example, the mode switching unit 105 calculates the driving distance by integrating the vehicle speed of the subject vehicle by the traveling period, compares the driving distance with the target distance, and thus determines whether the subject vehicle has traveled the target distance or not.

The vehicle control unit 106 controls the driving of the subject vehicle along the drive route. The vehicle control unit 106 sets the drive route for the subject vehicle to drive. The vehicle control unit 106 calculates a target vehicle speed and a target steering angle for traveling in the set drive route, and generates the control signal to drive the subject vehicle based on the calculated target vehicle speed and target steering angle. The generated control signal is output to the vehicle control device 5.

In the embodiment, the construction section determination device 6 includes the mode switching unit 105 and the vehicle control unit 106, but it is not limited thereto, and the vehicle control device 5 may include the function of the mode switching unit 105 and the function of the vehicle control unit 106. For example, the construction section determination device 6 may output information of the road construction section, for example, information of the start point and the end point of the road construction section to the vehicle control device 5 after determining the road construction section. Then, the vehicle control device 5 switches the driving modes based on the output road construction section information and the current position of the subject vehicle. The vehicle control device 5 calculates the target vehicle speed and the target steering angle for traveling in the drive route, and generates the control signal to drive the subject vehicle based on the calculated target vehicle speed and target steering angle.

Figure 3:
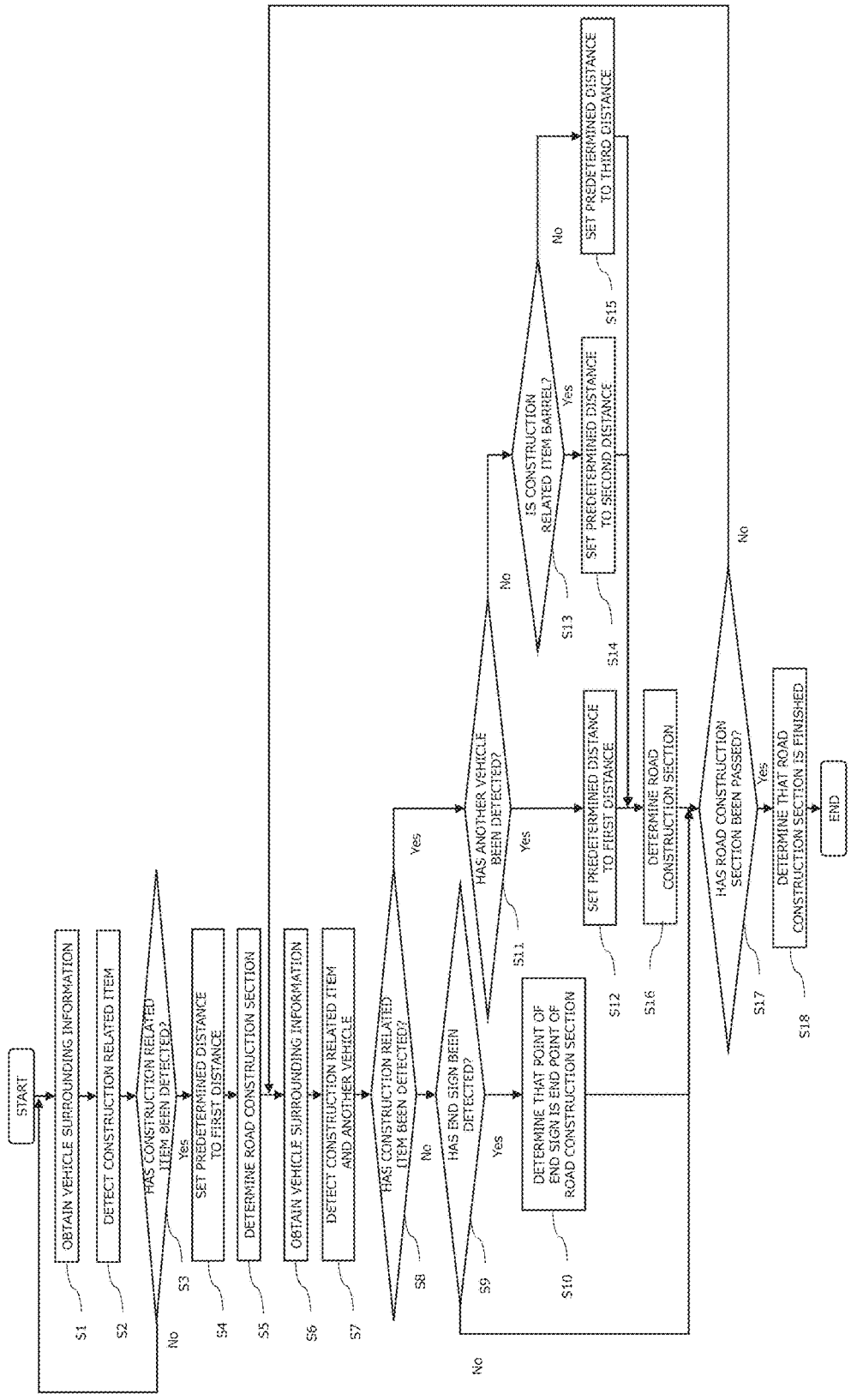
FIG. 3 is a flowchart illustrating an exemplary procedure in which control of the construction section determination method according to the embodiment is executed.

Next, a description will be given of a process relating to construction section determination control executed by the construction section determination device 6. FIG. 3 is a flowchart indicating a control flow for executing the construction section determination control in the construction section determination device 6. When the subject vehicle starts to drive, the processor 7 starts the control flow from Step S1. In the embodiment, the construction section determination device 6 sets the driving mode to the hands-on mode when the subject vehicle reaches the start point of the road construction section, and sets the driving mode to the hands-off mode when the subject vehicle reaches the end point of the road construction section.

At Step S1, the processor 7 obtains the vehicle surrounding information from the camera 11. At Step S2, the processor 7 detects the construction related item positioned ahead of the subject vehicle based on the vehicle surrounding information. At Step S3, the processor 7 determines whether the construction related item has been detected or not ahead of the subject vehicle based on the vehicle surrounding information. When determining that the construction related item has been detected ahead of the subject vehicle, the processor 7 proceeds to Step S4. When determining that the construction related item has not been detected ahead of the subject vehicle, the processor 7 returns to Step S1 and repeats the flow. At Step S4, the processor 7 sets the predetermined distance to the first distance. At Step S5, the processor 7 determines the road construction section. For example, the processor 7 determines that the position of the detected construction related item is the start point of the road construction section, and determines that the point separated by the first distance ahead of the subject vehicle from the position of the detected construction related item is the end point of the road construction section.

At Step S6, the processor 7 obtains the vehicle surrounding information from the camera 11. At Step S7, the processor 7 detects the construction related item and the other vehicle positioned ahead of the subject vehicle based on the vehicle surrounding information. At Step S8, the processor 7 determines whether the construction related item has been detected ahead of the subject vehicle or not. When determining that the construction related item has been detected ahead of the subject vehicle, the processor 7 proceeds to Step S11. When determining that the construction related item has not been detected ahead of the subject vehicle, the processor 7 proceeds to Step S9.

At Step S9, the processor 7 determines whether the end sign indicating that the road construction section is finished has been detected or not. When determining that the end sign has been detected, the processor 7 proceeds to Step S10. When determining that the end sign has not been detected, the processor 7 proceeds to Step S17. At Step S10, the processor 7 determines that a point where the end sign is set is the end point of the road construction section.

At Step S11, the processor 7 determines whether the other vehicle has been detected or not around the construction related item detected at Step S7 based on the vehicle surrounding information. When determining that the other vehicle has been detected, the processor 7 proceeds to Step S12. That is, when determining that the construction related item has been detected and the other vehicle has been detected around the detected construction related item, the processor 7 proceeds to Step S12. When determining that the other vehicle has not been detected, the processor 7 proceeds to Step S13. That is, when determining that the construction related item has been detected and the other vehicle has not been detected around the detected construction related item, the processor 7 proceeds to Step S13.

At Step S12, the processor 7 sets the predetermined distance to the first distance. At Step S13, the processor 7 determines whether all the detected construction related items are barrels or not. When determining that all the detected construction related items are barrels, the processor 7 proceeds to Step S14. When determining that all the detected construction related items are not barrels, the processor 7 proceeds to Step S15. At Step S14, the processor 7 sets the predetermined distance to the second distance. At Step S15, the processor 7 sets the predetermined distance to the third distance. In the embodiment, at Step S13, it may be determined whether all the construction related items are barrels or not, but the determination is not limited to this. It may be determined whether all the construction related items are road cones or not, and the predetermined distance may be set to the third distance when determining that all the construction related items are road cones.

At Step S16, the processor 7 determines the road construction section based on the set predetermined distance. The processor 7 determines that the point separated by the predetermined distance ahead of the subject vehicle from the construction related item is the end point of the road construction section. At Step S17, the processor 7 determines whether the subject vehicle has passed the road construction section or not. For example, the processor 7 determines whether the subject vehicle has passed the road construction section or not depending on whether the subject vehicle has reached the end point of the road construction section or not. When determining that the subject vehicle has passed the road construction section, the processor 7 proceeds to Step S18. When determining that the subject vehicle has not passed the road construction section, the processor 7 proceeds to Step S6. At Step S18, the processor 7 determines that the road construction section is finished, and sets the driving mode to the hands-off mode.

As described above, in the embodiment, the processor determines whether the construction related item has been detected or not ahead of the subject vehicle based on the vehicle surrounding information around the subject vehicle obtained by the sensor mounted on the subject vehicle. When determining that the construction related item has been detected, the processor determines that the point separated by the predetermined distance ahead of the subject vehicle from the construction related item is the end point of the road construction section, and the predetermined distance when the construction related item is detected and the other vehicle is not detected around the detected construction related item is shorter than the predetermined distance when the construction related item is detected and the other vehicle is detected around the detected construction related item. This allows identifying the end point of the road construction section based on the information detected by the sensor mounted on the subject vehicle.

In the embodiment, when determining that the construction related item has been detected, the processor determines whether the other vehicle has been detected or not in the detection range in which the sensor is allowed to detect the construction related item. This allows estimating the possibility of the detected other vehicle hiding the construction related item high, and avoiding unnecessary extension of the road construction section.

In the embodiment, when determining that the construction related item has been detected, the processor determines whether the other vehicle has been detected or not in the direction in which the construction related item is positioned with respect to the subject vehicle. This lowers the possibility of the other vehicle hiding the construction related item even when the other vehicle is detected in the direction different from the direction in which the construction related item is positioned, and therefore, when the other vehicle is not detected in the direction in which the construction related item is positioned, it is possible to determine at an earlier timing that the subject vehicle has passed the end point of the road construction section.

In the embodiment, when the sign indicating that the road construction section is finished is detected in the road construction section, the processor updates the end point to the point where the sign is disposed. This allows determining whether the subject vehicle has surely passed the end point of the road construction section or not when the sign indicating that the road construction section is actually finished is detected.

In the embodiment, the road construction section is the section where the driving of the subject vehicle is controlled in the hands-on state where the driver is requested to hold the steering wheel, and the end point is the point where the road construction section is switched to the normal section where the driving of the subject vehicle in the hands-off state where the driver takes his/her hands off the steering wheel is permitted. This allows resuming the driving of the subject vehicle in the state where the driver takes his/her hands off the steering wheel based on the information detected by the subject vehicle.

Note that the embodiment describe above is described for ease of understanding the present invention, and is not described for limiting the present invention. Accordingly, each component disclosed in the above-described embodiment has a gist including all the design changes and equivalents falling within the technical scope of the present invention.

DESCRIPTION OF REFERENCE NUMERALS

10 Drive assist system
6 Construction section determination device
7 Processor
100 Surrounding information obtaining unit
101 Detecting unit
102 Determining unit
103 Distance setting unit
104 Section determining unit
105 Mode switching unit
106 Vehicle control unit

The invention claimed is:

1. A construction section determination method comprising determining, executed by a processor, a road construction section in which a construction related item for traffic regulation is disposed while a subject vehicle is traveling, wherein the processor:
    determines whether the construction related item has been detected or not ahead of the subject vehicle based on vehicle surrounding information around the subject vehicle obtained by a sensor mounted on the subject vehicle; and
    determines that a point separated by a predetermined distance ahead of the subject vehicle from the construction related item is an end point of the road construction section when determining that the construction related item has been detected, and
    the predetermined distance when the construction related item is detected and another vehicle is not detected around the construction related item that is detected is shorter than the predetermined distance when the construction related item is detected and the other vehicle is detected around the construction related item.

2. The construction section determination method according to claim 1, wherein the processor determines whether the other vehicle has been detected or not in a detection range in which the sensor is allowed to detect the construction related item when determining that the construction related item has been detected.

3. The construction section determination method according to claim 1 or 2, wherein the processor determines whether the other vehicle has been detected or not in a direction in which the construction related item is positioned with respect to the subject vehicle when determining that the construction related item has been detected.

4. The construction section determination method according to claim 1, wherein, when a sign indicating that the road construction section is finished is detected in the road construction section, the processor updates the end point to a point where the sign is disposed.

5. The construction section determination method according to claim 1, wherein:
    the road construction section is a section in which driving of the subject vehicle is controlled in a hands-on state where a driver is requested to hold a steering wheel, and
    the end point is a point where the road construction section is switched to a normal section in which driving of the subject vehicle in a hands-off state where the driver takes his/her hands off the steering wheel is permitted.

6. A construction section determination device comprising a processor which determines a road construction section in which a construction related item for traffic regulation is disposed while a subject vehicle is traveling, wherein the processor is configured to:
    determine whether the construction related item has been detected or not ahead of the subject vehicle based on vehicle surrounding information around the subject vehicle obtained by a sensor mounted on the subject vehicle; and
    determine that a point separated by a predetermined distance ahead of the subject vehicle from the construction related item is an end point of the road construction section when determining that the construction related item has been detected, and
    the predetermined distance when the construction related item is detected and another vehicle is not detected around the construction related item that is detected is shorter than the predetermined distance when the construction related item is detected and the other vehicle is detected around the construction related item.

* * * * *